July 8, 1941.  G. P. SHEARER  2,248,482
SPOOL HOLDER
Filed Jan. 31, 1941
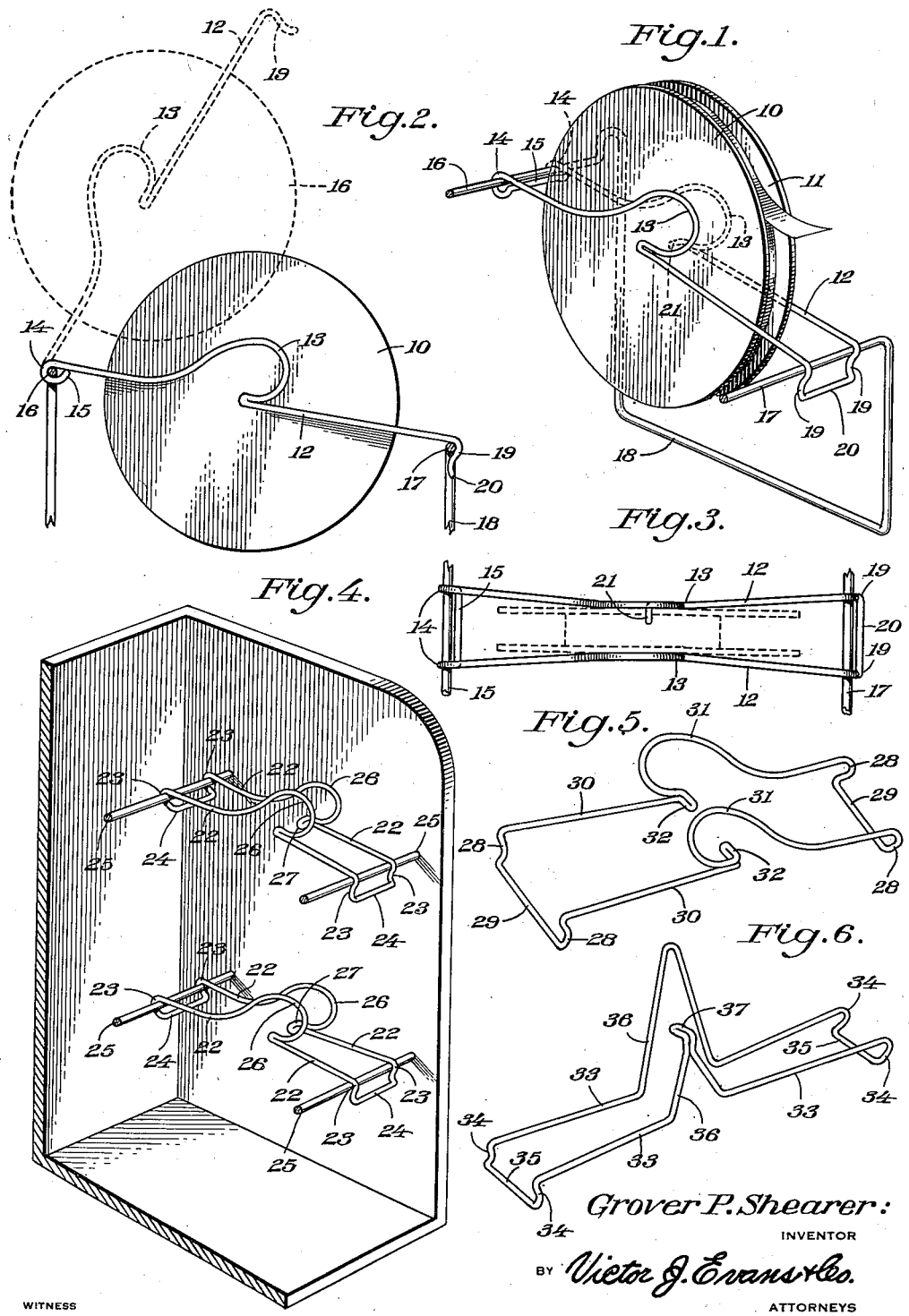
Grover P. Shearer:
INVENTOR
BY Victor J. Evans & Co.
ATTORNEYS Patented July 8, 1941

2,248,482

UNITED STATES PATENT OFFICE 2,248,482

SPOOL HOLDER

Grover P. Shearer, Fairmont, W. Va.

Application January 31, 1941, Serial No. 376,908

3 Claims. (Cl. 242—55.2)

This invention relates to spool holders especially adapted to hold ribbon and "Parafilm" used by florists, and other spools, and has for an object to provide a holder having open spring loops in the longitudinal side arms adapted to frictionally engage the sides of a spool and constitute a brake to retard too free rotation of the spool, the spring loops also lending resiliency to the holder to permit the holder to be elongated longitudinally so that it may be snapped onto and snapped off of a supporting frame to replace a used spool.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a perspective view of a spool holder constructed in accordance with the invention shown in applied position on a wire supporting frame.

Figure 2 is a side elevation of the parts shown in Figure 1.

Figure 3 is a plan view of the holder showing the longitudinal sides bowed inwardly to frictionally engage the sides of a spool and co-act with the spring loops in forming a brake.

Figure 4 is a perspective view of a holder provided with hook-shaped ends instead of a pivot at one end as shown in Figure 1, the hook-shaped ends permitting the holder to be snapped off of and snapped onto the supporting frame.

Figure 5 is a perspective view of a modified form of the invention showing the holder provided with oppositely disposed gudgeons to pivotally mount the spool instead of a single gudgeon as shown in Figure 4.

Figure 6 is a perspective view of another modified form of the invention showing the loops of a different shape than shown in Figure 5 and of relatively different heights.

Referring now to the drawing in which like characters of reference designate similar parts in the various views, 10 designates a conventional spool upon which is wound ribbon 11, "Parafilm" used by florists, or other ribbon material. For holding a spool of this type the present invention provides a holder preferably formed from a single length of wire bent to provide side bars 12 having open loops 13 intermediate their ends disposed in axial alinement with each other.

In one form of the invention the side bars terminate at one end in hinge eyes 14 which are integrally connected together by a cross bar 15 and are adapted to loosely receive a rear bar 16 of a supporting frame preferably formed of wire and including a front bar 17 disposed parallel with the rear bar and a substantially U-shaped standard 18 at each end, as is conventional.

The front ends of the side bars 12 of the holder are directed downwardly to form hooks 19 which are connected by a cross bar 20 and are adapted to snap over the front frame bar 17 so that the holder may be rocked upwardly and rearwardly to replace an empty spool 10 with a full spool.

The loops 13 are resilient and engage the sides of the spool 10. Also the side bars 12 of the holder are resilient and are bent inwardly toward each other at the central portions thereof, as best shown in Figure 3. The inwardly bent portions of the side bars hold the open loops 13 frictionally against the sides of the spool 10 and provide spaced brakes for retarding too free movement of the spool so that the ribbon can be pulled off of the spool but the spool will not rotate of itself freely.

One of the side bars 12 of the holder is directed inwardly upon itself at the bottom of the respective resilient loop 13 to provide a pivot 21 which is adapted to enter the bore of the spool and pivotally support the spool.

A modified form of the invention is shown in Figure 4 in which the side bars 22 of the holder are formed at both ends with hooks 23 connected by cross bars 24 which permit the holder being detachably mounted on the wire frame bars 25. In this form of the invention the side bars are provided intermediate their ends with open resilient loops 26 and one of the side bars is directed upon itself at the bottom of the respective loop to form a pivot 27 for pivotally mounting the spool on the holder. In this form of the invention by grasping a front cross bar 24 and pulling the same toward the operator, the spring loops 26 are expanded to permit the holder being extended longitudinally so that it may be lifted at the front end off the front frame bar 25 and then the rear hooks 23 may be completely detached from the rear frame bar 25 to replace an empty spool with a full spool. In this form of the invention the spring loops 26 also form friction brakes to prevent too free unwinding movement of the spool, the resilient side bars 22 being bent toward each other at the loops to enhance this frictional engagement of the loops with the sides of the spool.

In Figure 5 there is shown another modified form of the invention also preferably formed of a single length of spring wire bent at both ends to provide hooks 28 connected by cross bars 29 and adapted to be detachably mounted on a conventional wire frame as shown in Figures 1 and 4. In this form of the invention the side bars 30 are resilient and are bent intermediate their ends to provide open spring loops 31 which form friction brakes due to the side bars 29 being bent toward each other intermediate their ends. However, in this form of the invention both side bars are directed upon themselves inwardly at the bottom of the spring loops to provide oppositely disposed pinions or gudgeons 32 adapted to be inserted in the ends of the bore of the ribbon spool.

In Figure 6 there is shown another modified form of the invention which is also preferably formed of a single length of spring wire bent to provide opposite longitudinal side bars 33 which are bent at the opposite ends to provide hooks 34 which are connected by cross bars 35 and are adapted to detachably mount the holder on a conventional supporting frame. In this form of the invention the side bars 33 are bent toward each other centrally of their ends and at the center the side bars are bent upwardly to provide respective inverted V-shaped open loops 36, one of which is of greater height than the other, while the smaller spring loop is directed upon itself at its apex to form a pivot or gudgeon 37 adapted to pivotally mount a ribbon spool on the holder.

In each form of the invention the open spring loop permits the holder to be extended longitudinally by a pull upon one of the terminal cross bars to release the holder from the supporting frame. In all forms of the invention the longitudinal bars are bent toward each other at their central portions to cause the open central loops which are common to all forms of the invention to frictionally engage the sides of the spool and form frictional brakes.

From the above description it is thought that the construction and operation of the invention will be fully understood without further explanation.

What is claimed is:

1. A spool holder formed of an endless elongated loop of spring wire bent to provide spaced longitudinal arms and curved extremities for attaching the holder to parallel supporting wires, the wire being bent centrally of the arms to form open spring loops adapted to engage the sides of a spool and form a friction brake, the spring loops permitting the holder to be elongated longitudinally to be easily applied to and disengaged from one of said supports for replacing used spools with full spools, the wire being directed laterally upon itself at the bottom of one of the loops to form a gudgeon adapted to enter the bore of the spool and rotatably mount the spool on the holder.

2. A spool holder formed of an endless elongated loop of spring wire bent to provide spaced longitudinal arms and hook extremities adapted to spring over and support the holder upon parallel supporting wires, one of the hooked ends being adapted to form a hinge eye while the other hooked end is freely detachable from the respective supporting wire, the wire being bent centrally of the arms to form open loops, the arms being bent toward each other at the loops to cause the loops to frictionally engage the sides of a spool and form a brake, the loops permitting the holder to be elongated longitudinally so as to be easily disengaged at one end from the respective supporting wire, the wire being directed laterally upon itself at the bottom of one of the loops to form a gudgeon adapted to enter the bore of the spool and rotatably mount the spool on the holder.

3. The structure as of claim 2 and in which the wire is directed laterally upon itself at the bottom of both loops to provide oppositely disposed gudgeons adapted to enter the bore of the spool.

GROVER P. SHEARER.